United States Patent
Tidwell

(10) Patent No.: US 9,235,612 B1
(45) Date of Patent: Jan. 12, 2016

(54) MANAGEMENT OF EVENT DATA

(71) Applicant: Time Warner Cable Enterprises LLC, New York, NY (US)

(72) Inventor: Justin O. Tidwell, Waxhaw, NC (US)

(73) Assignee: Time Warner Cable Enterprises LLC, New York, NY (US)

( * ) Notice: Subject to any disclaimer, the term of this patent is extended or adjusted under 35 U.S.C. 154(b) by 269 days.

(21) Appl. No.: 13/855,959

(22) Filed: Apr. 3, 2013

(51) Int. Cl.
*G06F 17/30* (2006.01)
*H04N 21/44* (2011.01)
*H04N 21/442* (2011.01)

(52) U.S. Cl.
CPC .... *G06F 17/30321* (2013.01); *G06F 17/30339* (2013.01); *H04N 21/44222* (2013.01)

(58) Field of Classification Search
CPC ............... G06F 17/30315; G06F 17/30321; G06F 17/30162; G06F 17/30339; G06F 11/3438; G06F 2212/401; H04N 21/6582; H04N 21/44222; G06Q 30/0201
See application file for complete search history.

(56) References Cited

U.S. PATENT DOCUMENTS

| | | | | |
|---|---|---|---|---|
| 4,587,633 | A * | 5/1986 | Wang et al. | 709/234 |
| 5,479,587 | A * | 12/1995 | Campbell et al. | 358/1.17 |
| 8,365,212 | B1 * | 1/2013 | Orlowski | 725/13 |
| 8,365,213 | B1 * | 1/2013 | Orlowski | 725/13 |
| 8,543,523 | B1 * | 9/2013 | Palit et al. | 706/12 |
| 8,701,135 | B2 * | 4/2014 | Yazdani et al. | 725/19 |
| 2002/0138509 | A1 * | 9/2002 | Burrows et al. | 707/501.1 |
| 2007/0061831 | A1 * | 3/2007 | Savoor et al. | 725/13 |
| 2013/0084056 | A1 * | 4/2013 | Harsh et al. | 386/248 |
| 2014/0082660 | A1 * | 3/2014 | Zhang et al. | 725/32 |
| 2014/0109124 | A1 * | 4/2014 | Morales et al. | 725/14 |
| 2014/0351835 | A1 * | 11/2014 | Orlowski | 725/9 |

* cited by examiner

Primary Examiner — William Spieler
(74) Attorney, Agent, or Firm — Chapin IP Law, LLC

(57) ABSTRACT

A data management resource receives event log data indicating content consumption by multiple subscribers in a network environment. The data management resource converts the event data into bit strings stored in a multi-dimensional information array. One dimension of the multi-dimensional information array represents the multiple subscribers. Another dimension of the multi-dimensional information array represents time. The bit strings stored in the multi-dimensional information array indicate at what time, if any, a respective subscriber tunes to consume particular. The data compression resource stores a compressed rendition of the multi-dimensional array information in a repository for subsequent application of queries.

21 Claims, 10 Drawing Sheets

MANAGEMENT OF EVENT DATA

BACKGROUND

In general, conventional data compression includes encoding information using fewer bits than a respective original bit representation. Thus, conventional data compression techniques have been used to reduce data storage requirements associated with corresponding content.

Data compression can be lossy or lossless. For example, as its name suggests, lossy compression includes removing less needed bit information during compression. When decompressing data compressed using a lossy compression algorithm, the removed bit information is lost and cannot be retrieved. In certain instances, loss of a small amount of data may not be particularly important when reproducing a rendition of an original signal or image.

Lossless compression may be more desirable over lossy compression because it may be undesirable to lose bit information upon reconstruction of a rendition of the original data.

It is sometimes desirable to compress event data obtained in a cable network environment. For example, a cable network environment may include many subscribers that tune to different content available over many different available channels. Log information collected in the cable network environment can specify which content subscriber's select for consumption. Typically, keeping track of tuning information for many subscribers over many different viewable channels produces an inordinate amount of data to manage.

As discussed above, content consumption information can be compressed using conventional algorithms. However, even standard compression of content consumption information can require a large amount of storage capacity to store respective data.

BRIEF DESCRIPTION OF EMBODIMENTS

Conventional ways of managing content consumption information in a network environment suffer from a number of deficiencies. For example, as mentioned, conventional use of compression techniques can be used to encode information using fewer bits than a respective original bit representation. However, significant resources such as time and data processing resources may be required to compress and decompress content consumption information. In certain instances, conventional decompression of encoded information can result in a reproduction of content consumption information that is not particularly useful in terms of processing queries. For example, tuning information for thousands of subscribers typically must be processed in order to produce a response to a query attempting to ascertain, for instance, how many subscribers where tuned in to a particular network at a particular time.

Embodiments herein deviate with respect to conventional techniques. For example, one embodiment herein is directed to converting content consumption information into a desired format and then applying a compression algorithm to reduce storage requirements of the content consumption information.

More specifically, one embodiment herein includes a data management resource and a data compression resource. The data management resource receives event or log data indicating content consumption by multiple subscribers in a network environment. The data management resource processes the event data and converts the event data into a multi-dimensional information array. One dimension of the multi-dimensional array represents the multiple subscribers. Another dimension of the multi-dimensional information represents time. The data compression resource compresses and stores the multi-dimensional information of content consumption information in a repository.

The multi-dimensional information array can track content consumption information such as data specifying which of the subscribers tune to particular available content over time. In one embodiment, converting the event data into the multi-dimensional information array includes: for each respective subscriber, producing a corresponding bit string indicating whether a respective subscriber tunes to the particular available content; and storing the corresponding bit string in a respective column of the multi-dimensional information array assigned to the respective subscriber.

The multi-dimensional information array can include sequences of cells to store the bit strings. The data management resource can set bits in the corresponding bit strings to different states to indicate instances in which the respective subscriber tunes to the particular available content.

To compress the multi-dimensional information array, the data compression resource obtains a respective row of the multi-dimensional information array. Settings of bits in the respective row indicate which of the subscribers are tuned to the particular channel of available content. The data compression resource initiates storage of a compressed rendition of the respective row in the repository.

In accordance with further embodiments, certain rows can be assigned to be master rows. The data compression resource produces difference information between settings of bits in the master row and one or more subsequent rows in the multi-dimensional information array. The data compression resource can produce a compressed rendition of the difference information and store the compressed rendition of the difference information in a repository.

Further embodiments herein include producing offset information associated with the compressed content consumption information. For example, one embodiment herein includes producing offset information indicating relative locations in a respective file where a compressed rendition of each of multiple rows of the multi-dimensional information array are stored. The offset information can be used to quickly identify which portions of the file store content of interest.

In one embodiment, the compressed multi-dimensional information array stored in the file indicates which of the multiple subscribers selects corresponding particular content for retrieval in a network such as a cable network environment. The system as discussed herein can include a query data management resource. The query data management resource can receive a query or command to identify which of the multiple subscribers tuned to particular available content. To answer the query, the query data management resource retrieves the compressed multi-dimensional information array. Via a data decompression resource, the query data management resource initiates decompressing an appropriate portion of the file to reproduce a rendition of the multi-dimensional information array. Based on analyzing the reproduced rendition of the multi-dimensional information array, the query data management resource produces a response to the query.

In accordance with further embodiments, the data compression resource applies a loss-less compression algorithm to the multi-dimensional information array to produce compressed multi-dimensional information array for storage in the repository.

In accordance with another embodiment, a data management resource receives content consumption information. As its name suggests, the content consumption information specifies different content consumed by subscribers in a network environment. The data management resource converts the content consumption information into multiple bit strings. Settings of bits in each of the multiple bit strings indicates times in which a respective subscriber in the network environment is tuned to consume a corresponding content playback selection available in the network environment. A data compression resource produces a compressed rendition of the multiple bit strings and stores the compressed rendition of the multiple bit strings in a repository. Compressing the bit strings can include first partitioning the bit strings.

Each of the multiple bit strings can represent a sequence of time. A corresponding location of bits in the multiple bit strings represents a time in the sequence. The settings of the bits at different locations of a respective bit string indicate whether a corresponding subscriber is tuned to consume particular content.

To produce a compressed rendition of the multiple bit strings, the data management resource can be configured to produce a first sequence of bits to include a corresponding bit value from each of the bit strings as stored at a first bit location in the bit strings. The data compression resource stores a rendition of the first sequence (e.g., a row) of bits in a file. The data management resource produces a second sequence of bits (e.g., another row) to include a corresponding bit value from each of the bit strings as stored at a second bit location in the bit strings. The data compression resource stores a rendition of the second sequence of bits in the file. The data decompression resource repeats this process. In this manner, the data compression resource stores a portion of the bit string information in a respective file.

Each of the bit strings includes multiple bit locations disposed between a respective first bit location and the second bit location. In such an instance, the data compression resource produces difference information for bit values in the multiple bit locations based on a comparison of values in the multiple locations of the bit strings to the first sequence of bits.

In accordance with yet another embodiment, as discussed above, a data management resource can be configured to produces a multi-dimensional information array to include multiple rows and columns of cells. The data management resource assigns a unique subscriber value to each of the columns. The data management resource assigns a unique time value to each of the rows. The data management resource then populates the cells with values to indicate which of multiple subscribers consume particular content over time.

These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiment includes a computer readable storage medium and/or system having instructions stored thereon. The instructions, when executed by a processor of a respective computer device, cause the processor or multiple processors of the system to: receive event data indicating content tuning selections made by multiple subscribers in a network environment; convert the event data into a multi-dimensional information array, a first dimension of the multi-dimensional array being a subscriber array representing the multiple subscribers, a second dimension of the multi-dimensional information array being a time array representing time; compress the multi-dimensional information array; and store the compressed multi-dimensional information array in a repository.

Yet another embodiment herein includes a computer readable storage medium and/or system having instructions stored thereon. The instructions, when executed by a processor of a respective computer device, cause the processor or multiple processors of the system to: receive log data indicating tuning selections made by multiple subscribers in a network environment in which content is available; convert the log data into multiple bit strings, settings of bits in each of the multiple bit strings indicating times in which a respective subscriber is tuned to a corresponding content playback selection available in the network environment; produce a compressed rendition of the multiple bit strings; and store the compressed rendition of the multiple bit strings in a repository.

Still another embodiment herein includes a computer readable storage medium and/or system having instructions stored thereon. Such instructions, when executed by a processor of a respective computer device, cause the processor or multiple processors of the system to: produce a multi-dimensional information array to include multiple rows and columns of cells; assign a unique subscriber value to each of the columns; assign a unique time value to each of the rows; and populate the cells with values to indicate which of multiple subscribers tuned to particular content over time.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for processing content consumption information. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

Figure 1:
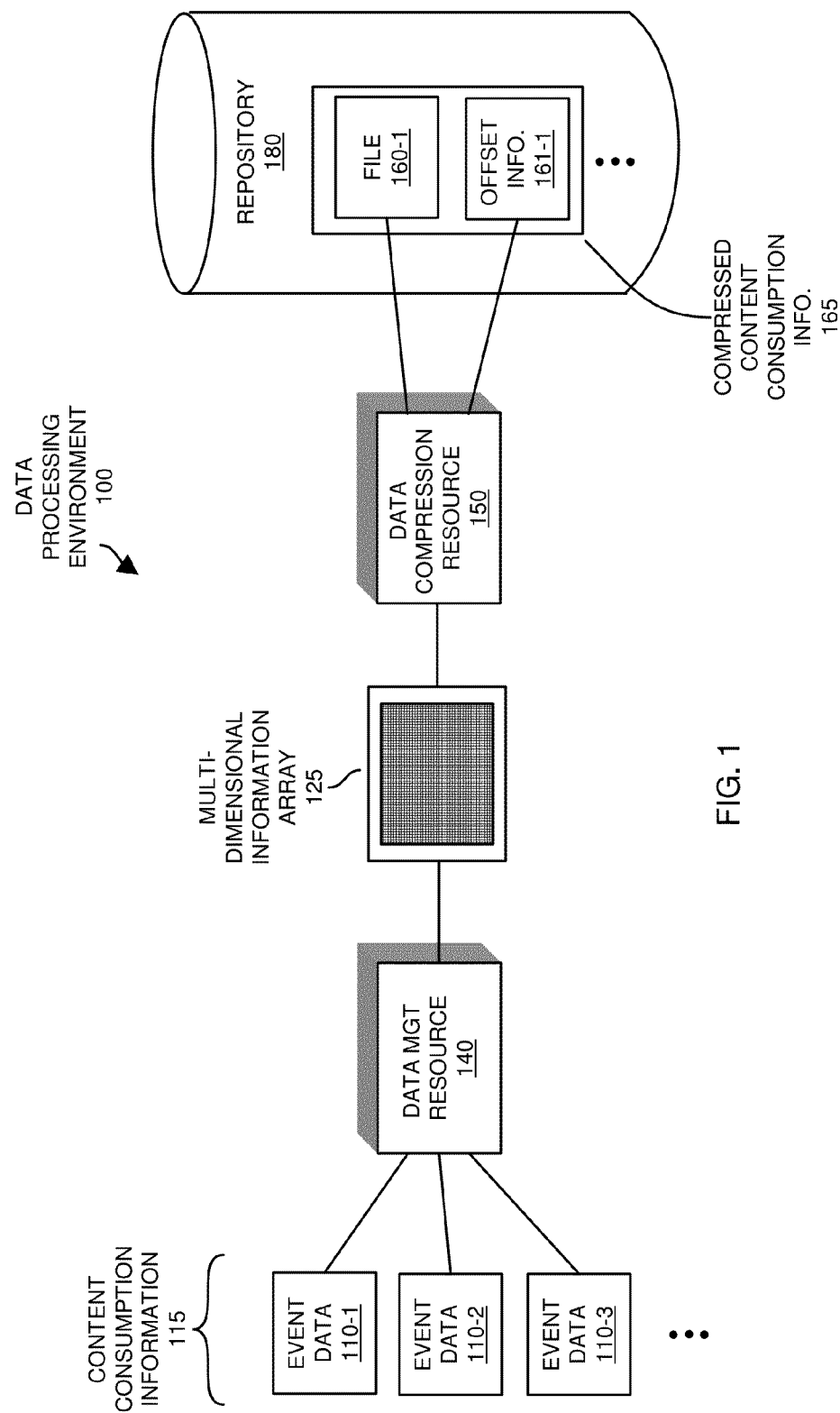
FIG. 1 is an example diagram illustrating a data processing environment according to embodiments herein.

Now, more specifically, FIG. 1 is an example diagram illustrating a data processing environment according to embodiments herein.

As shown, data processing environment 100 includes data management resource 140 and data compression resource 150. Data management resource 140 receives and content consumption information 115. Content consumption information 115 can include event data 110-1, event data 110-2, event data 110-3, etc. (collectively, event data 110).

By way of a non-limiting example, event data 110 indicates content consumption by multiple subscribers in a network environment. Consumption as discussed herein includes retrieval of content, playback of content, storage of content in a repository such as a digital video recorder, tuning to a channel, etc.

In one non-limiting example embodiment, the event data 110 specifies which of multiple available channels each of multiple subscribers a respective subscriber tunes to retrieve content for playback, storage, etc.

The data management resource 140 converts the received event data into multi-dimensional information array 125. In one non-limiting example embodiment, as will be discussed later in this specification, one dimension of the multi-dimensional array represents the multiple subscribers. Another dimension of the multi-dimensional information represents time.

Data compression resource 150 compresses and stores a rendition of the multi-dimensional information array 125 as compressed content consumption information 165 in repository. In one embodiment, compressed content consumption information 165 includes file 160-1 and offset information 161-1.

Figure 2:
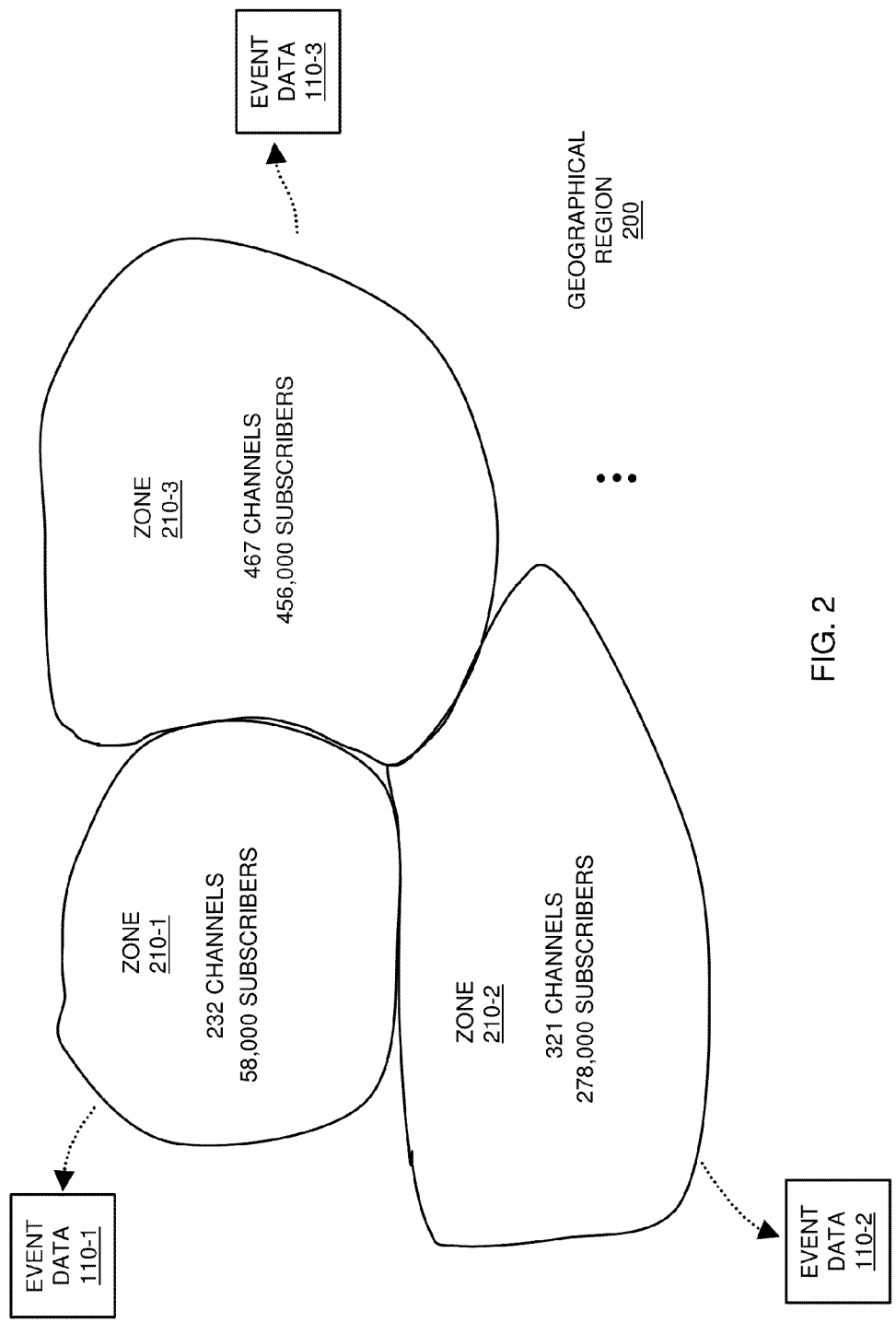
FIG. 2 is an example diagram illustrating zones of subscribers in a network environment according to embodiments herein.

FIG. 2 is an example diagram illustrating partitioning of a geographical region to include multiple zones according to embodiments herein.

More specifically, geographical region 200 includes zone 210-1, zone 210-2, zone 210-3, etc. The geographical region 200 can include any number of zones.

In one embodiment, each zone can represent a portion of a content delivery network in which content is made available for consumption to multiple subscribers in a network. For example, in one embodiment, each of the zones 210 represents a portion of a cable network environment in which respective subscribers in the zone are able to selectively tune and consume content.

Content can be retrieved over any suitable channel or link. For example, subscribers can retrieve content from scheduled threshold value channels, video on demand channels, over-the-top content channels, etc.

Assume in this non-limiting example embodiment that a respective service provider provides services to 58,000 subscribers in zone 210-1. Services in zone 210-1 can include making 232 different channels of content available to respective subscribers. Event data 110-1 can indicate which channels of content each of the respective subscribers in the zone 210-1 tune to over time.

Further in this non-limiting example embodiment, the service provider can provide services to 278,000 subscribers in zone 210-2. Services in zone 210-2 can include making 321 different channels of content available to respective subscribers. Event data 110-2 can indicate which channels of content each of the respective subscribers in the zone 210-2 tune to over time.

Further in this non-limiting example embodiment, zone 210-3 provides services to 456,000 subscribers. Services in zone 210-3 can include making 467 different channels of content available to respective subscribers. Event data 110-3 can indicate which channels of content each of the respective subscribers in the zone 210-3 tune to over time.

Figure 3:
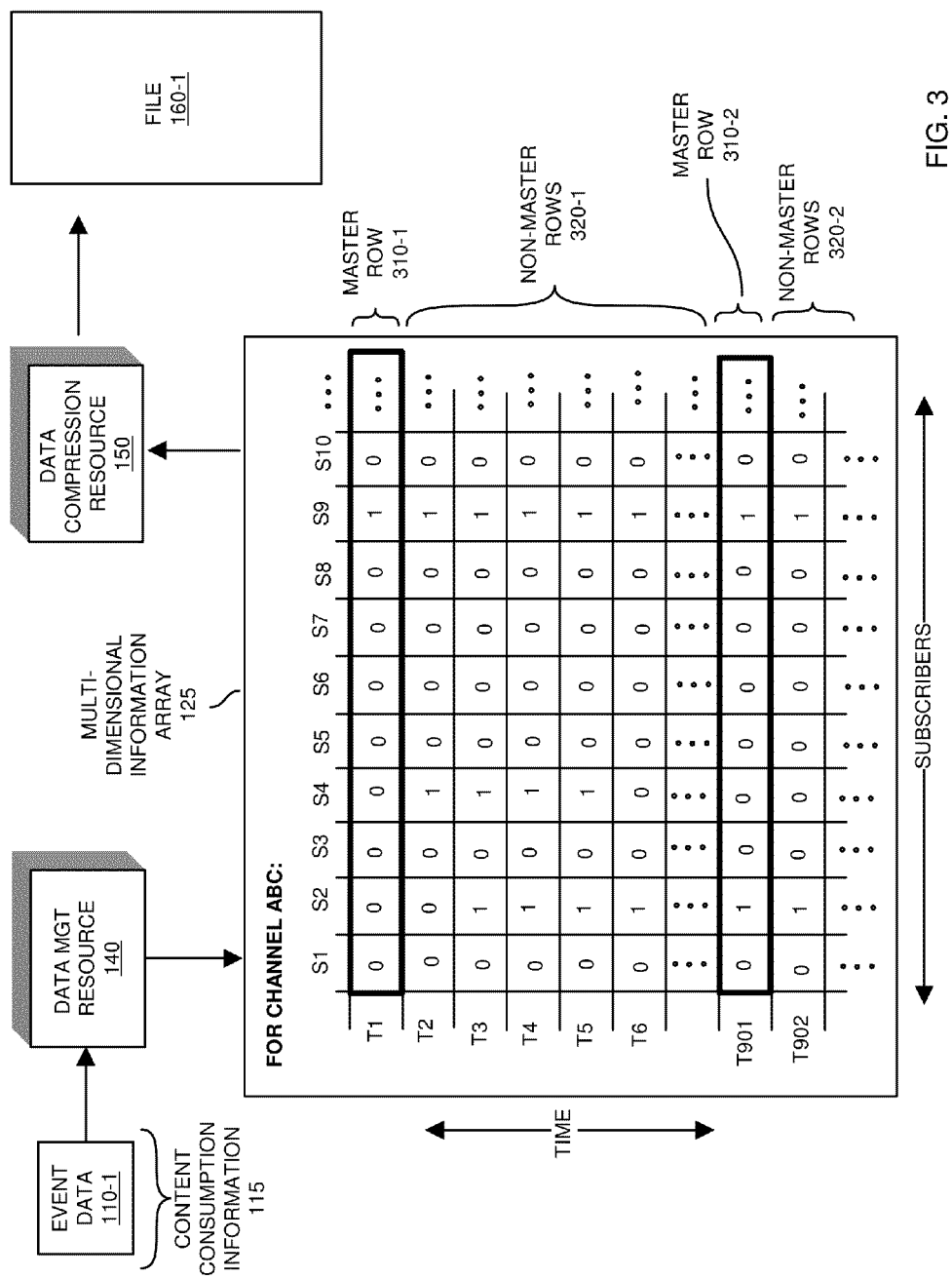
FIG. 3 is an example diagram illustrating generation of a multi-dimensional information array to store content consumption information according to embodiments herein.

FIG. 3 is an example diagram illustrating generation of content consumption information as a multi-dimensional information array according to embodiments herein.

As shown, in one embodiment, data management resource 140 produces the multi-dimensional information array 125 to include multiple rows and columns of cells. Depending on the embodiment, each cell can be configured to store a single or multi-bit value.

In one example embodiment, the data management resource 140 assigns a unique subscriber value such as S1, S2, etc., (corresponding to a subscriber in the cable network environment) to each of the columns in the multi-dimensional information array 125. Assume in this example that S1 corresponds to a first subscriber; S2 corresponds to a second subscriber; S3 corresponds to a third subscriber, and so on.

The data management resource 140 assigns a unique time value (e.g., T1, T2, T3, . . . ) to each of the rows in multi-dimensional information array 125. The time value for each cell of rows represents any suitable time duration such as a second, minute, etc.

Note that the multi-dimensional information array 125 can include any number of rows. Assume in this example that each row in the multi-dimensional information array 125 represents a time duration of one second. Assume further that the multi-dimensional information array stores content consumption information for a single day for a single channel such as channel ABC.

To produce content consumption information for whole day, the multi-dimensional information array can include 86,400 rows. There are 86,400 seconds in a day. Each row in the multi-dimensional information array represents a range of time such as a one second duration.

In this non-limiting example embodiment, time T1 can represent a first second of time, T2 can represent a second of time, T3 can represent a third second of time, and so on.

Recall that event data 110-1 corresponds to zone 210-1 including 58,000 subscribers. As mentioned, the multi-dimensional information array 125 can include one column for each subscriber in a zone. Accordingly, in this non-limiting example embodiment, the multi-dimensional information array 125 includes 58,000 columns.

Further in this non-limiting example embodiment, note that the multi-dimensional information array 125 includes a large number of cells. As a non-limiting example, the multi-dimensional information array 125 can include (86,400 seconds times 58,000 subscribers) 50.112 billion cells to store respective content consumption information for channel ABC for a given day.

Assume in this non-limiting example embodiment that the data management resource 140 allocates each respective cell in the multi-dimensional information array 125 to store a single bit value indicating whether a respective subscriber tuned to the particular content at a given instant in time associated with the respective cell.

The data management resource 140 processes the event data 110-1 (log information) to identify channel selections by the subscribers. For example, assume that the event data 110-1 indicates that subscriber S1 does not tune to channel ABC for the given day represented by content consumption information in multi-dimensional information array 125; assume that the event data 110-1 includes a first time stamp indicating that subscriber S2 tunes to channel ABC starting at time T3 and a second time stamp indicating that the subscriber S2 discontinues tuning to channel ABC at time T1803; assume that the event data 110-1 indicates that subscriber S3 does not tune to channel ABC for the given day represented by content consumption information in multi-dimensional information array 125; assume that the event data 110-1 includes a first time stamp indicating that subscriber S4 tunes to channel ABC starting at time T2 and a second time stamp indicates that the subscriber S4 discontinues tuning to channel ABC at time T5 (i.e., the subscriber S5 tunes to channel ABC for several seconds); and so on.

In one non-limiting example embodiment, the data management resource 140 then populates the cells of the multi-dimensional information array 125 with bit string values to indicate which of multiple subscribers consume the particular content provided by channel ABC over time.

For example, in this non-limiting example embodiment, the data management resource 140 populates column S1 in the multi-dimensional information array 125 with a bit string of 86,400 logic zero values (e.g., 000000 . . . ) to indicate that subscriber S1 did not tune to channel ABC for the given day; the data management resource 140 populates column S2 in the multi-dimensional information array 125 with a bit string of 001111 . . . as shown to indicate that the subscriber S2 tunes to channel ABC between time T3 and time T1803; the data management resource 140 populates column S3 in the multi-dimensional information array 125 with a bit string of 86,400 logic zero values (e.g., 000000 . . . ) to indicate that subscriber S3 did not tune to channel ABC for the given day; the data management resource 140 populates column S4 in the multi-dimensional information array 125 with a bit string of 011110 . . . as shown to indicate that the subscriber S4 tunes to channel ABC between time T2 and time T5; and so on.

Thus, embodiments herein include populating the cells in the multi-dimensional information array 125 with bit strings indicating instances in time in which the respective subscriber tuned to the particular content provided by channel ABC. This transformation of the content consumption information 115 into bit strings enables unique processing. For example, as discussed later in this specification, a query can request to know how many subscribers in the network are tuned to view channel ABC between in a particular time range. To answer the query, a search engine processes the columns or bit strings of data to identify which of the subscribers is assigned a setting of logic 1, indicating that the respective subscriber tunes to a channel.

Note that the multi-dimensional information array 125 can represent a single day of content consumption information. For each channel in a zone, the data management resource 140 can be configured to produce a respective multi-dimensional information array 125 for each day of the year. Thus, the data management resource 140 can be configured to produce a large amount of information to keep track of content consumption information for each of the channels in a zone.

As previously discussed, in one embodiment, the data compression resource 150 compresses the multi-dimensional information array 125 to save on storage space. For example, the data compression resource 150 partitions the multi-dimensional information array 125 into sections. Each section can of the multi-dimensional information array 125 can include a respective master row and multiple non-master rows.

As an example, the section of rows between time T1 and T900 (e.g., 900 seconds or a 15 minute time interval) can include master row 310-1 and non-master rows 320-1; the section of rows between time T901 and T1800 (e.g., a next 15 minute time interval) can include master row 310-2 and non-master rows 320-2; and so on.

Thus, at selected intervals of time (e.g., every 15 minutes or 900 seconds) in the multi-dimensional information array 125, the data compression resource 150 can select rows of cells to be master rows.

For each respective section of the sections: the data compression resource 150 produces difference information indicating a difference between non-master rows in the respective section and a master row in the respective section.

More specifically, the data compression resource 150 can be configured to store a rendition of master row 310-1 in the file 160-1.

The data compression resource 150 produces difference information between the row at time T2 (row of data after master row 310-1) with respect to the master row 310-1. The data compression resource 150 stores the difference information (between row T2 and row T1) in file 160-1.

The data compression resource 150 produces difference information between the row at time T3 with respect to the master row 310-1. The data compression resource 150 stores the difference information (between row T3 and row T1) in file 160-1.

As further discussed below, the data compression resource repeats this process to create file 160-1.

Embodiments herein can include generating the difference information in any suitable manner. For example, if desired, as an alternative to producing information between a respective non-master row and the master row 310-1, embodiments herein can include producing the difference information based on settings of the previous non-master row.

Figure 4:
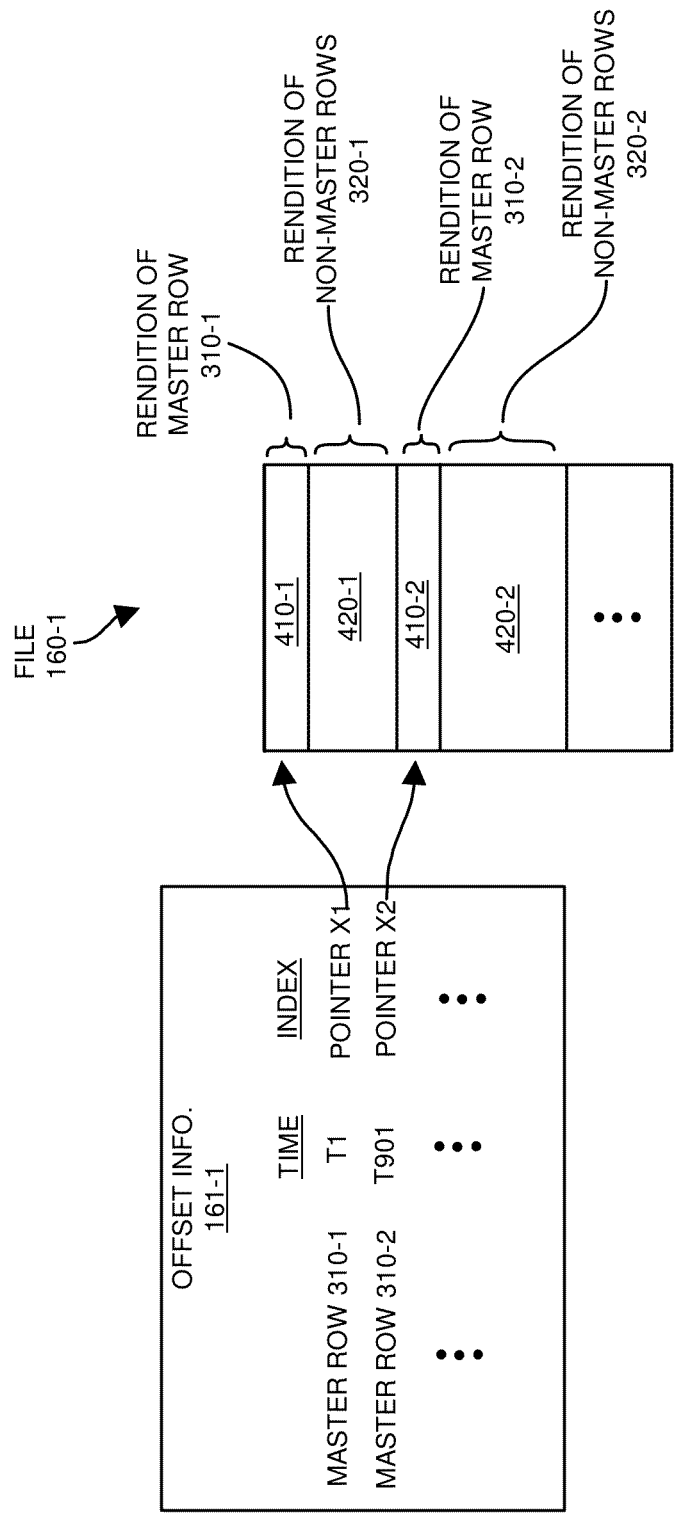
FIG. 4 is an example diagram illustrating offset information and a corresponding file according to embodiments herein.

FIG. 4 is an example diagram illustrating storage of the master rows and difference information in a respective file according to embodiments herein.

In one embodiment as discussed herein, the data compression resource 150 compresses the multi-dimensional information array 125 and initiates storage of a compressed rendition of the multi-dimensional information array 125 as file 160-1 in repository 180.

More specifically, as shown by way of a non-limiting example, the data compression resource 150 stores a rendition of the bit information in master row 310-1 in region 410-1 of file 160-1. As mentioned, the data compression resource 150 can be configured to store the master row 310-1 as compressed data to save storage space.

The data compression resource 150 produces a pointer X1 to indicate a location of region 410-1 in the file 160-1 where the master row 310-1 is stored. The data compression resource 150 populates the offset information 161-1 (such as an index file) with pointer X1 as shown to indicate that the bit string for master row 310-1 (or row for time T1) is stored in region 410-1 of the file 160-1.

In addition to storing a rendition of the master row 310-1 in the file 160-1, the data compression resource 150 also stores a rendition of difference information associated with the rows in file 160-1. For example, in one embodiment, to produce difference information for non-master row at time T2, the data compression resource 150 compares the row at T2 with the master row 310-1 (e.g., row T1) in the multi-dimensional information array 125. The data compression resource 150 stores the produced difference information for the non-master row at T2 to indicate a difference between the non-master row at T2 and the master row 310-1.

The data compression resource 150 repeats this process for each of the non-master rows 320-1. For example, the data compression resource 150 produces difference information for non-master row at time T3 based on a comparison of the row at T3 with respect to the master row 310-1 (e.g., row T1) in the multi-dimensional information array 125. The data compression resource 150 stores difference information for the row at T3 to indicate a difference between the non-master row at T3 and the master row 310-1.

Note again that as a possible alternative to storing difference information for a given row with respect to the master row network a section, embodiments herein can alternatively include comparing the given row under test to the last row in order to generate the difference information. Any suitable method can be used to generate difference information for storage in file 160-1.

The data compression resource 150 initiates storage of difference information associated with non-master rows 320-1 in region 420-1 of file 160-1. If desired, the offset information 161-1 can include one or more pointers indicating locations where the difference information is stored.

The data compression resource 150 further processes the multi-dimensional information array 125 and stores a rendition of the bit information in master row 310-2 of multi-dimensional information array 125 in region 410-2 of file 160-1. In a similar manner as discussed above, the data compression resource 150 can be configured to store the master row 310-2 as compressed data in region 410-2 to save on storage space in file 160-1.

The data compression resource 150 produces a pointer X2 to indicate a location of region 410-2 in the file 160-1 where the master row 310-2 is stored. The data compression resource 150 populates the offset information 161-1 with pointer X2 as shown to indicate that the bit string for master row 310-2 is stored in region 410-2 of the file 160-1.

In a similar manner as discussed above, the data compression resource 150 compares each of the non-master rows 320-2 (e.g., rows between time T901 to T1800) to the master row 310-2. Based on the comparison, the data compression resource 150 produces respective difference information and stores the difference information in region 410-2.

As mentioned, if desired, note that the offset information 161-1 can be configured to include additional pointer information indicating where the difference information is stored in the file 160-1. For example, the offset information 161-1 can be configured to include a pointer Y1 indicating that difference information for non-master rows 320-1 is stored in region 420-1; the offset information 161-1 can be configured to include a pointer Y2 indicating that difference information for non-master rows 320-2 is stored in region 420-2; and so on.

In this manner, for each respective section (e.g., a master row and respective set of non-master rows) of the multiple sections in the multi-dimensional information array 125, the data compression resource 150: stores a (compressed) rendition of the master row in the respective section in file 160-1 and stores a rendition of the difference information for the respective section in file 160-1. As previously discussed, the data compression resource 150 produces the index file (offset information) to keep track of locations of the master rows 310 and corresponding difference information for a respective section in the file 160-1.

Referring again to FIG. 3, note that amount of data (e.g., rendition of master rows, rendition of difference information, etc.) stored in a section of a respective file may vary in size over a course of the day. For example, the size of region 410-1 (such as number of bits) needed to store a rendition of master row 310-1 may be different in size than region 410-2 needed to store a respective rendition of master row 310-2; and so on. The size of region 420-1 (such as number of bits) needed to store respective difference information associated with non-master rows 320-1 may be smaller than size of region 420-2 needed to store respective difference information associated with non-master rows 320-2; and so on. Accordingly, the master rows and corresponding difference information may not be stored linearly throughout the file 160-1.

Use of offset information 161-1 such as pointers enables a query engine to quickly identify where compressed content consumption information of interest is stored in the file 160-1.

Embodiments herein are unique over conventional techniques. For example, in one embodiment, the data compression resource 150 effectively produces a compressed rendition of the multiple bit strings in columns of the multi-dimensional information array 125. The data compression resource 150 produces a first sequence of bits such as the master row 310-1 to include a corresponding bit value at a first location (e.g., location T1 for each column) from each of the vertically stored subscriber bit strings in multi-dimensional information array 125. Thus, the master row 310-1 includes a bit value from the first location for each of the subscriber bit strings. As mentioned, the data compression resource 150 stores a rendition of the first sequence of bits at location T1 in file 160-1.

The data management resource 140 produces a second sequence of bits (e.g., the non-master row of data at time T2) to include a corresponding bit value from each of the bit strings as stored at a second bit location (e.g., the time T2 bit location) in the vertically stored bit strings in the multi-dimensional information array 125. As previously discussed, via difference information, the data compression resource 150 stores a rendition of the second sequence of bits (the row at time T2) in the file.

As shown in the multi-dimensional information array 125, each of the bit strings in respective columns includes multiple bit locations disposed between the first bit location (e.g., a respective cell at time T1) and the second bit location (e.g., a respective cell at time T86400) in the bit string sequence. As mentioned, the data compression resource 150 produces difference information for bit values in the multiple bit locations (e.g., row at time T3, row at time T4, etc.) based on comparison of values in the multiple locations of the bit strings to the first sequence of bits.

In this manner, the data compression resource 150 stores portions of the bit string information associated with each subscriber in a respective file.

Note that in addition to storing information associated with one or more rows as discussed herein, embodiments herein can include pre-processing all or a portion of each of the sections of multiple rows and producing respective metadata.

For example, the data management resource 140 and/or data compression resource 150 can be configured to process the rows in each respective 15-minute interval (such as between time T1 and T900, between time T901 and time T1800, etc.) to determine instances in which a respective subscriber tunes at least one time to the respective channel. The data management resource 140 and/or data compression resource 150 can be configured to produce a string of information (such as a row metadata) indicating which of the subscribers tunes to the channel ABC at least one during the respective 15-minute interval.

More specifically, based on OR'ing the rows in the interval between time T1 and T900 to produce metadata from multi-dimensional information array 125, the first cell of the row of produced metadata is set to a logic zero indicating that subscriber S1 did not tune to the channel ABC during the time interval; the second cell of the row of metadata is set to a logic one indicating that subscriber S2 did tune to the channel ABC during the time interval; the third cell of the row of metadata is set to a logic one indicating that subscriber S3 did tune to the channel ABC during the time interval; the fourth cell of the row of metadata is set to a logic zero indicating that subscriber S4 did not tune to the channel ABC during the time interval; and so on. The data compression resource 150 stores the produced row of metadata in file 160-1 or other suitable resource.

In accordance with another example embodiment, the processing as discussed herein can include generating a row of metadata for the interval between time T1 and T900 to indicate whether a respective subscriber tuned to the channel ABC for the full duration of the time interval. In other words, a logic one setting for a respective subscriber can indicate that the subscriber tuned to the respective channel ABC for the interval of time between T1 and T900; a logic zero setting for a respective subscriber can indicate that the subscriber did not tune to the respective channel ABC for the interval of time between T1 and T900.

Figure 5:
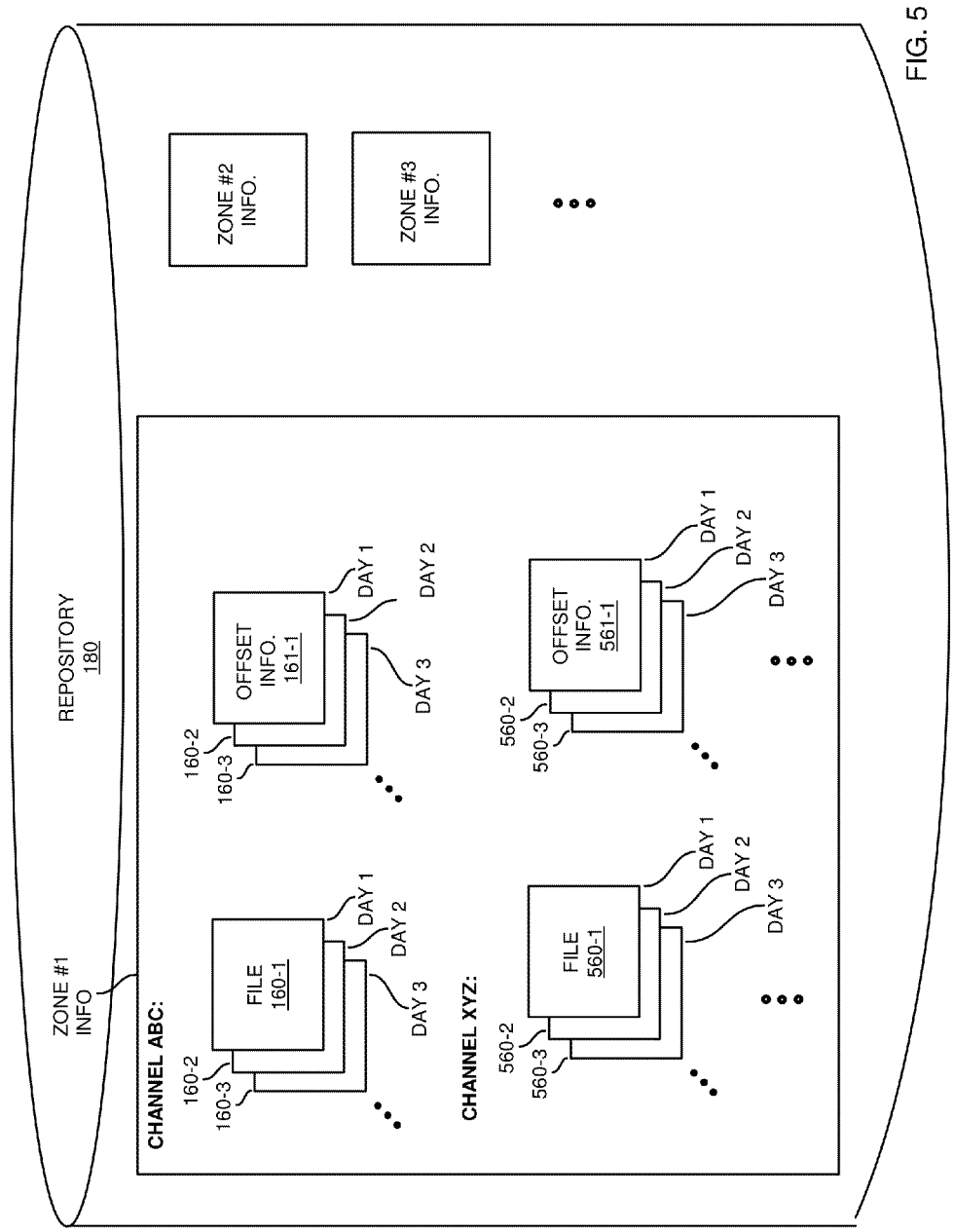
FIG. 5 is an example diagram illustrating generation of compressed content consumption information for each of multiple channels according to embodiments herein.

FIG. 5 is an example diagram illustrating storage of the content consumption information in a repository according to embodiments herein.

As previously discussed, embodiments herein can include generating a respective file of content consumption information for a given channel in a respective zone for each day of the year. The data compression resource 150 stores the generated files and corresponding offset information in repository 180.

More specifically, in this non-limiting example embodiment, the data compression resource 150 can be configured to produce file 160-1 and corresponding offset information 161-1 based on a respective multi-dimensional information array of content consumption information for day #1 associated with channel ABC in zone #1; the data compression resource 150 can be configured to produce file 160-2 and corresponding offset information 161-2 based on a respective multi-dimensional information array of content consumption information for day #2 associated with channel ABC in zone #1; the data compression resource 150 can be configured to produce file 160-3 and corresponding offset information 161-3 based on a respective multi-dimensional information array of content consumption information for day #3 associated with channel ABC in zone #1; and so on.

In a manner as discussed herein, the data compression resource 150 can be configured to produce file 560-1 and corresponding offset information 561-1 based on a respective multi-dimensional information array of content consumption information for day #1 associated with channel XYZ in zone #1; the data compression resource 150 can be configured to produce file 560-2 and corresponding offset information 561-2 based on a respective multi-dimensional information array of content consumption information for day #2 associated with channel XYZ in zone #1; the data compression resource 150 can be configured to produce file 560-3 and corresponding offset information 561-3 based on a respective multi-dimensional information array of content consumption information for day #3 associated with channel XYZ in zone #1; and so on.

The content consumption information stored for each zone amounts to an inordinately large amount of data. However, the manner of storing the content consumption information as discussed herein is beneficial because it lends itself to simple processing.

Note that each subscriber (such as a subscriber domain) can own or include multiple different types of devices to which content is transmitted. As mentioned, a logic one in a respective column of multi-dimensional information array setting information indicates that at least one device owned or operated by the subscriber was used to tune to respective content or a channel. It is possible that a subscriber owns multiple devices that simultaneously tune to different channels. For example, the subscriber can include one device tuned to channel ABC and one device tuned to channel XYZ. In such an instance, the file 160-1 and file 560-1 capture the simultaneous tuning event.

Figure 6:
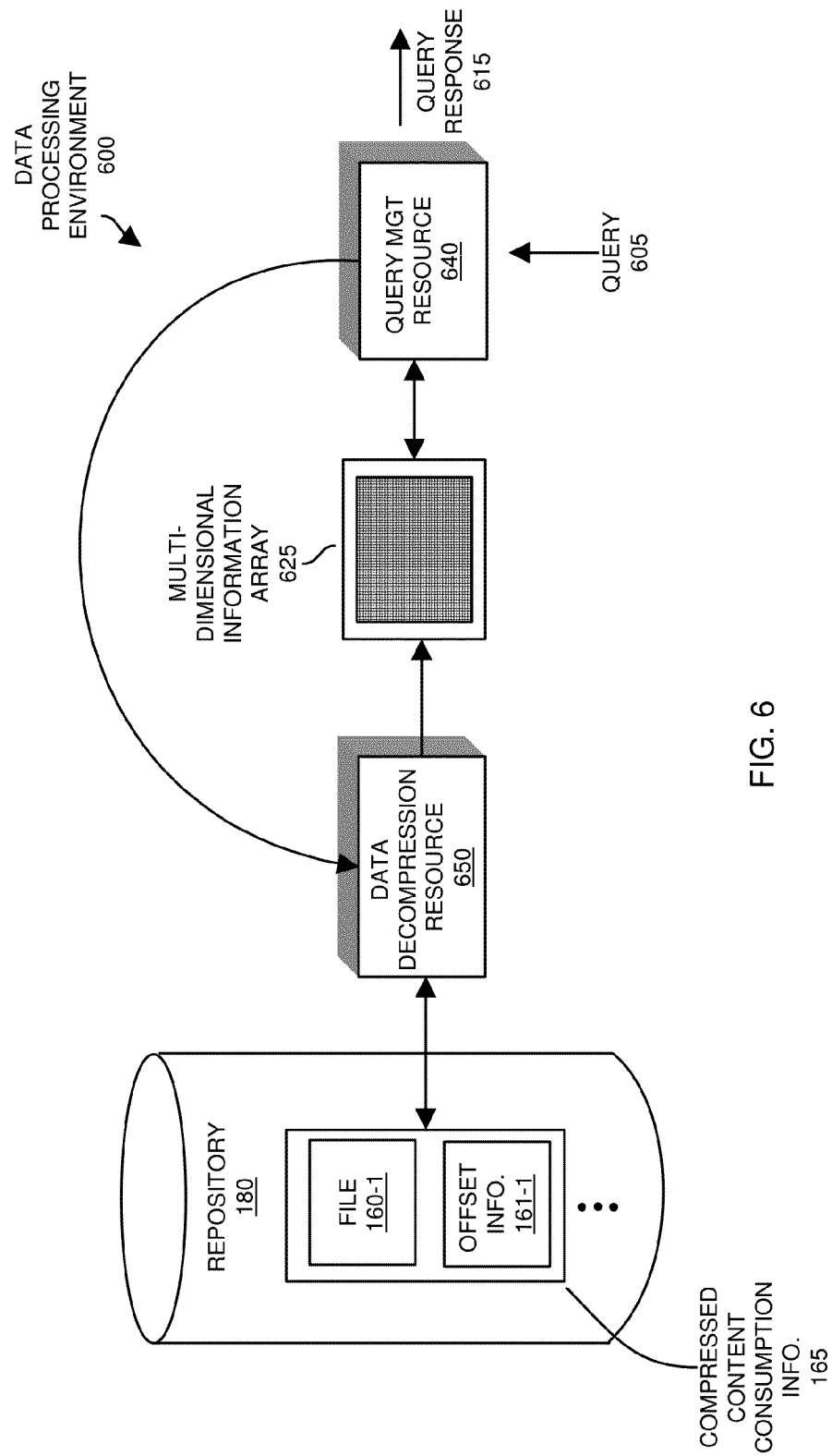
FIG. 6 is an example diagram illustrating decompression and further processing of content consumption information according to embodiments herein.

FIG. 6 is an example diagram illustrating use of compressed content consumption information and generation of a query response according to embodiments herein.

As shown, data processing environment 600 includes a data decompression resource 650 as well as a query management resource 640. As shown, the query management resource 640 receives a query 605 from a resource such as a human, machine, etc.

In one non-limiting example embodiment, the query management resource 640 processes the query 605 to identify to which content consumption information (e.g., files of compressed data in repository 180) the query 605 is directed.

Assume in this example that the query 605 would like to know how many subscribers tune to the channel ABC in zone #1 during a time slot such as between 12:00 midnight and 1:00 am on a specified day such as day #1. To answer the query 605, the query management resource 640 notifies data compression resource 650 to retrieve the appropriate data such as portions of file 160-1 from repository 180.

Data compression resource 650 retrieves and converts the retrieved content consumption information for channel ABC at day #1 and stores it in multi-dimensional information array 625.

Conversion of the content consumption information can include utilizing offset information 161-1 to identify the location of the data of interest. For example, the data of interest in this example occurs between 12:00 midnight and 1:00 am on day #1. As previously discussed, the time 12:00 midnight corresponds to time T1, time 12:15 am corresponds to T901, time 12:30 am corresponds to T1801, time 12:45 am corresponds to T2701, and so on.

The data decompression resource 650 uses the pointer X1 to identify that a compressed rendition of master row 310-1 for time T1 is stored in region 410-1 of file 160-1; the data decompression resource 650 uses the pointer X2 to identify that a compressed rendition of master row 310-2 for time T901 is stored in region 410-2 of file 160-1; and so on.

The data decompression resource 650 retrieves and decompresses the respective data stored in regions 410-1, 410-2, etc., of file 160-1 and stores the decompressed data in multi-dimensional information array 625.

The data decompression resource 650 also retrieves the corresponding difference information stored in regions 420-1, 420-2, etc., of file 160-1. If the difference information is compressed, the data decompression resource 650 decompresses the respective data stored in regions 420-1, 420-2, etc., and uses the information to reproduce a rendition of each of the non-master rows of data for times T2-T900, T902 to T1800, etc.

Accordingly, via the offset information 161-1 and the information stored in file 160-1, the data decompression resource 650 produces the multi-dimensional information array 625 to be a copy of the data in multi-dimensional information array 125.

As previously discussed, the algorithm used to compress and decompress stored information can be lossless such that the settings of cells in multi-dimensional information array 625 match the settings of corresponding the cells of multi-dimensional information array 125.

In one non-limiting example embodiment, to process query 605, the data decompression resource 650 applies boolean algebra to the bit strings or columns of data in the multi-dimensional information array 625 to identify events as specified by the query. For example, as mentioned, the query 605 can include a request to identify how many subscribers tune to the channel ABC between time range 12:00 midnight and 1:00 am on day #1. To identify how many subscribers tune to channel ABC, the query management resource 650 identifies which of the columns in the multi-dimensional information array 625 includes at least one logic one value in a cell between time T1 and time T3600. The query management resource 650 can determine the number that tune to the channel ABC in this time range by logically OR'ing each of the rows between time T1 and T3600 and then counting the number of logic 1 values in the resulting string.

Assume in this example that only subscribers S2, S4, and S9 tune to channel ABC in this time range as shown. In such an instance, because only columns S2, S4, and S9 include at least one logic one setting, the query management resource 640 produces the query response to indicate that three subscribers watched the channel ABC in this time range. Accordingly, embodiments herein can include producing a response to the query 605 based on results of applying the boolean algebra to the bit strings of data stored in multi-dimensional information array 625.

Further embodiments herein can include use of a bit mask to filter data stored in the multi-dimensional information array 625. For example, the query management resource 650 can be configured to receive a bit mask associated with the query 605. The bit mask can specify subscribers of interest such as even numbered subscribers S2, S4, S6, S8, etc.

As discussed above, the query management resource 650 can be configured to process the rows and/or columns of data in multi-dimensional information array 625 to identify which of the subscribers tunes to the channel ABC in the respective time range. The query 605 may be interested in knowing how many even numbered subscribers view the channel ABC in the time range. After applying a logic OR operation to the rows of data, the query management resource applies (via an AND operation) the bit mask 0101010 . . . to the result of OR'ing the rows.

After applying the bit mask (0101010101 . . . ) to the resulting bit string 0101000000 . . . , the query management resource 640 sums the number of logic ones (in location 2 and location 4) of the result (0101000000 . . . ) to produce a result of two. That is, there are two even numbered subscribers (S2 and S4) that tune to the channel ABC in the specified time range. In such an instance, the query management resource 650 produces the query response 615 to specify that two subscribers tuned to channel ABC in the specified time range.

In this manner, the query management resource 640 can receive a query with respect to the content consumption information and generate appropriate responses.

Figure 7:
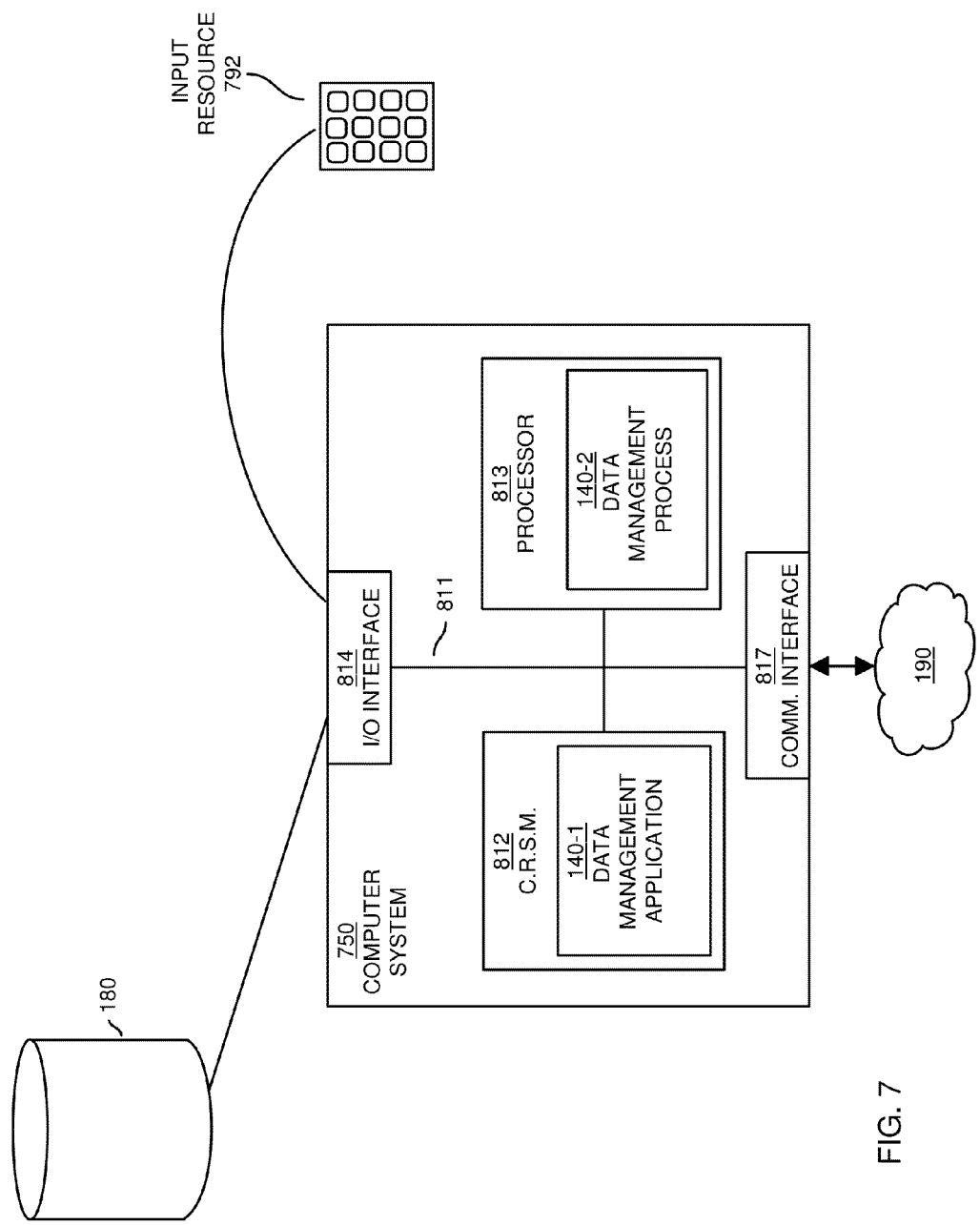
FIG. 7 is a diagram illustrating an example computer architecture in which to execute any of the functionality according to embodiments herein.

FIG. 7 is an example block diagram of a computer device for implementing any of the operations as discussed herein according to embodiments herein.

As shown, computer system 750 such as a computer device operated by the user, a server resource, a wireless access point, etc., of the present example can include an interconnect 811 that couples computer readable storage media 812 such as a non-transitory type of media (i.e., any type of hardware storage medium) in which digital information can be stored and retrieved, a processor 813 (e.g., one or more processor devices of hardware), I/O interface 814, and a communications interface 817.

I/O interface 814 provides connectivity to a repository 180 and, if present, other devices such as a playback device, display screen, keypad (input resource 792), a computer mouse, etc.

Computer readable storage medium 812 can be any hardware storage resource or device such as memory, optical storage, hard drive, floppy disk, etc. In one embodiment, the computer readable storage medium 812 stores instructions and/or data.

Communications interface 817 enables the computer system 750 and processor 813 to communicate over a resource such as network 190 to retrieve information from remote sources and communicate with other computers. I/O interface 814 enables processor 813 to retrieve stored information from repository 180.

As shown, computer readable storage media 812 is encoded with data management application 140-1 (e.g., software, firmware, etc.) executed by processor 813. Data management application 140-1 can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in data management application 140-1 stored on computer readable storage medium 812.

Execution of the data management application 140-1 produces processing functionality such as server process 140-2 in processor 813. In other words, the data management process 140-2 associated with processor 813 represents one or more aspects of executing server application 140-1 within or upon the processor 813 in the computer system 750.

Those skilled in the art will understand that the computer system 750 can include other processes and/or software and hardware components, such as an operating system that controls allocation and use of hardware resources to execute data management application 140-1.

In accordance with different embodiments, note that computer system may be any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 750 may reside at any location or can be included in any suitable resource in network environment 100 to implement functionality as discussed herein.

Note that each of resources such as the data management resource 140, data compression resource 150, data decompression resource 650, etc., can include a respective application of instructions, computer readable storage medium to store the instructions, and a processor to execute the instructions to carry out respective functions as discussed herein.

Functionality supported by the different resources will now be discussed via flowcharts in FIGS. 8-10. Note that the steps in the flowcharts below can be executed in any suitable order.

Figure 8:
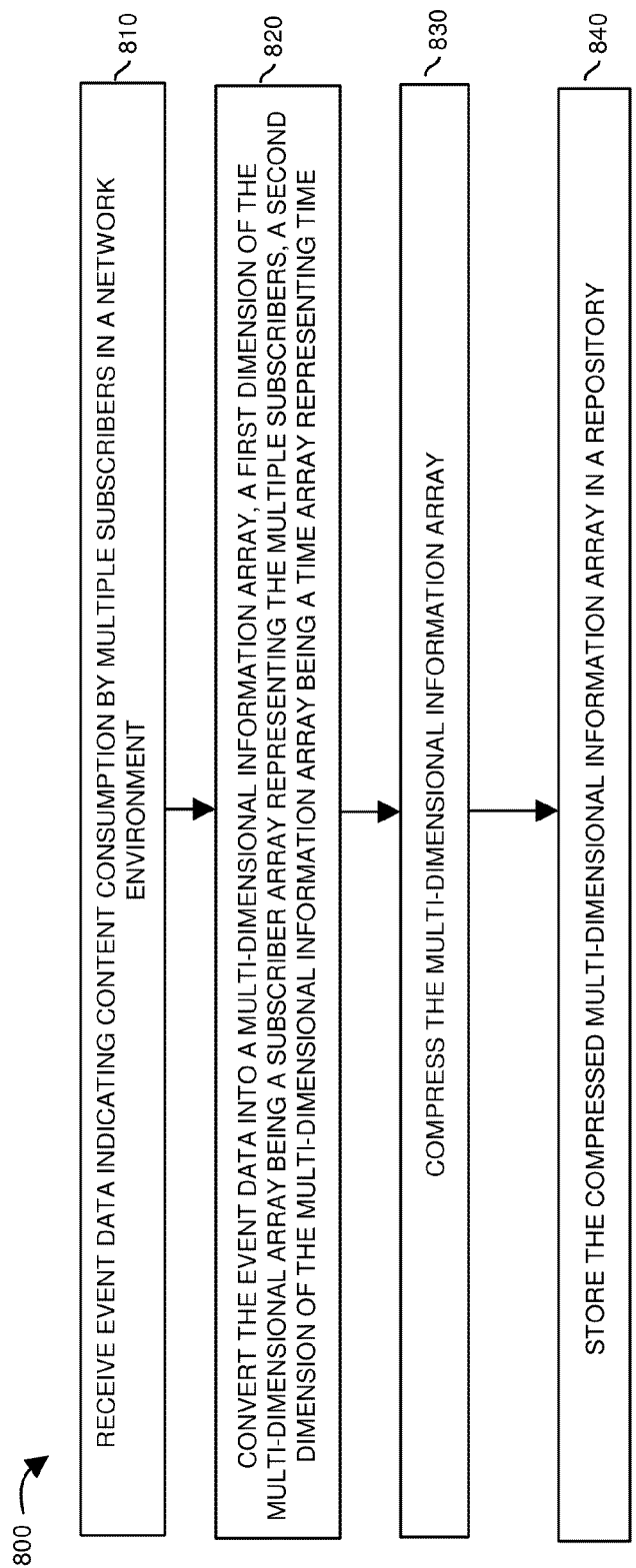
FIGS. 8-10 are example diagrams illustrating different methods according to embodiments herein.

FIG. 8 is a flowchart 800 illustrating an example method according to embodiments. Note that there will be some overlap with respect to concepts as discussed above.

In processing block 810, the data management resource 140 receives event data 110 indicating content consumption by multiple subscribers in a network environment.

In processing block 820, the data management resource 140 converts the event data 110 into a multi-dimensional information array 125. A first dimension of the multi-dimensional information array is a subscriber array representing the multiple subscribers S1, S2, S3, etc. A second dimension of the multi-dimensional information array 125 is a time array representing time such as T1, T2, T3, etc.

In processing block 830, the data management resource 140 produces a compressed rendition of the multi-dimensional information array 125.

In processing block 840, the data management resource 140 stores the compressed rendition of the multi-dimensional information array 125 as file 160-1 in a repository 180.

Figure 9:
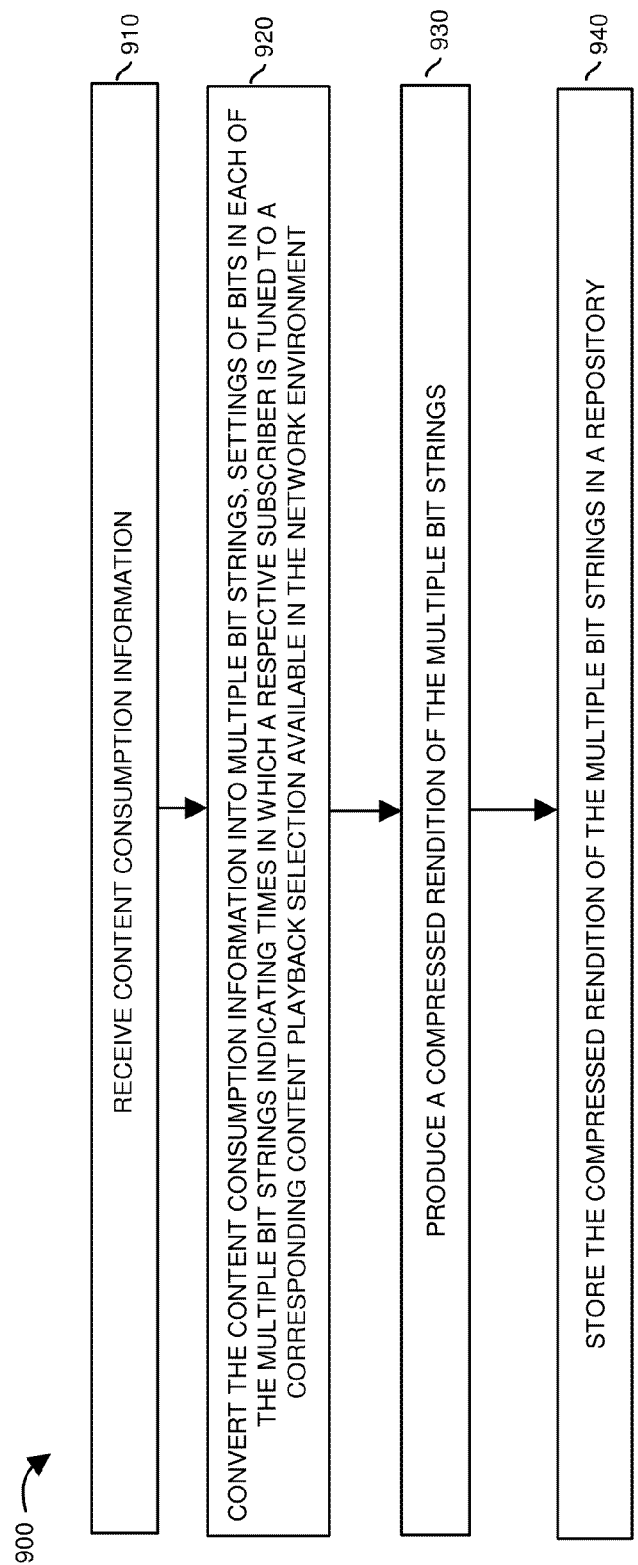

FIG. 9 is a flowchart 900 illustrating an example method according to embodiments. Note that there will be some overlap with respect to concepts as discussed above.

In processing block 910, the data management resource 140 receives content consumption information.

In processing block 920, the data management resource 140 converts the content consumption information into multiple bit strings such as columns of multi-dimensional information array 125. Settings of bits in each of the multiple bit strings indicates times in which a respective subscriber is tuned to a corresponding content playback selection available in the network environment.

In processing block 930, the data management resource 140 produces a compressed rendition of the multiple bit strings.

In processing block 940, the data management resource 140 stores the compressed rendition of the multiple bit strings in a repository 180.

Figure 10:
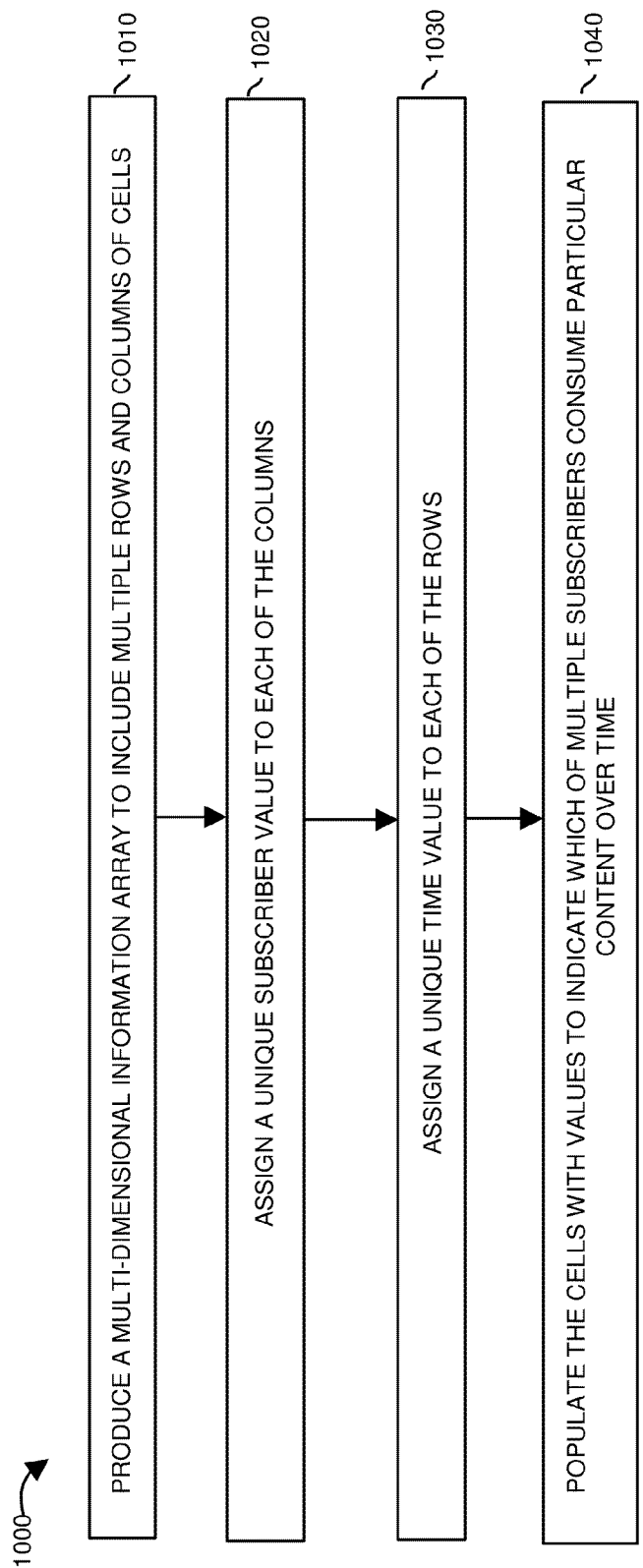

FIG. 10 is a flowchart 1000 illustrating an example method according to embodiments. Note that there will be some overlap with respect to concepts as discussed above.

In processing block 1010, the data management resource 140 produces a multi-dimensional information array 125 to include multiple rows and columns of cells.

In processing block 1020, the data management resource 140 assigns a unique subscriber value such as S1, S2, S3, etc., to each of the columns.

In processing block 1030, the data management resource 140 assigns a unique time value to each of the rows.

In processing block 1040, the data management resource 140 populates the cells with values to indicate which of multiple subscribers consume particular content over time.

Note again that techniques herein are well suited for managing and storing content consumption information. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
   receiving event data indicating content consumption by multiple subscribers in a network environment;
   converting the event data into a multi-dimensional information array, a first dimension of the multi-dimensional information array being a subscriber array representing the multiple subscribers, a second dimension of the multi-dimensional information array being a time array representing time, bit strings of data along the first dimension of the multi-dimensional information array indicating which of the multiple subscribers tune to a particular channel of available content at respective times;
   compressing the multi-dimensional information array; and
   storing the compressed multi-dimensional information array in a repository;
   wherein compressing the multi-dimensional information array includes:
   at times spaced apart in accordance with a predetermined time interval value, selecting bit strings of data along the first dimension corresponding to the times to be master bit strings in the multi-dimensional information array;
   for multiple intermediate bit strings of the multi-dimensional information array between a first master bit string and a second master bit string, producing difference information indicating a difference between each of the multiple intermediate bit strings and the first master bit string.

2. The method as in claim 1,
   wherein converting the event data into the multi-dimensional information array includes:
   for each respective subscriber, producing a corresponding bit string indicating whether a respective subscriber tunes to the particular channel of available content; and
   storing the corresponding bit string in a respective column of the multi-dimensional information array assigned to the respective subscriber.

3. The method as in claim 2 further comprising:
   setting bits in the corresponding bit string to different states to indicate instances in which the respective subscriber tunes to the particular channel of available content.

4. The method as in claim 1, wherein storing the compressed multi-dimensional information array in the repository includes storing the compressed multi-dimensional information array as a file, the method further comprising:
   producing offset information, the offset information indicating relative locations in the file where a compressed rendition of each of multiple rows of the multi-dimensional information array are stored.

5. The method as in claim 1, wherein the compressed multi-dimensional information array indicates which of the multiple subscribers selects the particular channel of available content for retrieval, the method further comprising:
   receiving a query to identify which of the multiple subscribers tuned to the particular channel of available content;
   retrieving the compressed multi-dimensional information array;
   decompressing the multi-dimensional information array to reproduce a rendition of the multi-dimensional information array; and
   based on analyzing the reproduced rendition of the multi-dimensional information array, producing a response to the query.

6. The method as in claim 1, wherein compressing the multi-dimensional information array includes:
   applying a loss-less compression algorithm to the multi-dimensional information array to produce compressed multi-dimensional information array.

7. A method comprising:
   producing a multi-dimensional information array to include multiple intersecting rows and columns of cells;
   assigning a unique subscriber value to each of the columns;
   assigning a unique time value to each of the rows; and
   populating the cells with values to indicate which of multiple subscribers tuned to particular content over time;
   compressing the multi-dimensional information array; and
   initiating storage of the compressed multi-dimensional information array in a repository;
   wherein compressing the multi-dimensional information array includes:
   at times spaced apart in accordance with a predetermined time interval value, selecting rows of the cells corresponding to the times to be master rows in the multi-dimensional information array;
   for multiple rows of the multi-dimensional information array between a first master row and a second master row, producing difference information indicating a difference between each of the multiple rows and the first master row.

8. The method as in claim 7 further comprising:
   allocating each respective cell in the multi-dimensional information array to store a single bit value indicating whether a respective subscriber tuned to the particular content at a given instant in time associated with the respective cell.

9. The method as in claim 7, wherein populating the cells with values includes producing a bit string for each respective subscriber, the bit string indicating instances in time in which the respective subscriber tuned to the particular content; and
   storing the bit string for each respective subscriber in a corresponding column of the multi-dimensional information array assigned to the respective subscriber.

10. The method as in claim 7 further comprising:
receiving a bit mask;
applying the bit mask to the multi-dimensional information array to filter data of interest; and
utilizing the data of interest to produce a response to a query.

11. The method as in claim 7, wherein compressing the multi-dimensional information array includes:
partitioning the multi-dimensional information array into sections of equal size as defined by the predetermined time interval value, each respective section of the sections including a respective master row and multiple non-master rows; and
for each respective section of the sections: producing difference information indicating a difference between non-master rows in the respective section and a master row in the respective section.

12. The method as in claim 11 further comprising:
for each respective section of the sections: storing a representation of the master row in the respective section and storing a rendition of the difference information for the respective section in a file.

13. The method as in claim 12 further comprising:
producing an index file to keep track of a location of the master rows and corresponding difference information for a respective section in the file.

14. The method as in claim 7, wherein the multi-dimensional information array is a grid including the rows and the columns.

15. The method as in claim 7, wherein the bit strings of data includes a first bit string and a second bit string, settings of cells in the first bit string indicating which of the multiple subscribers tunes to the particular channel at a first instance in time, settings of cells in the second bit string indicating which of the multiple subscribers tunes to the particular channel at a second instance in time, the second instance in time occurring after the first instance in time.

16. A computer system comprising:
a processor device; and
a hardware storage resource coupled to the processor, the hardware storage resource storing instructions that, when executed by the at least one processor device, causes the at least one processor device to perform operations of:
producing a multi-dimensional information array to include multiple intersecting rows and columns of cells;
assigning a unique subscriber value to each of the columns;
assigning a unique time value to each of the rows; and
populating the cells with values to indicate which of multiple subscribers tuned to particular content over time;
compressing the multi-dimensional information array; and
initiating storage of the compressed multi-dimensional information array in a repository;
wherein compressing the multi-dimensional information array includes:
at times spaced apart in accordance with a predetermined time interval value, selecting rows of the cells corresponding to the times to be master rows in the multi-dimensional information array;
for multiple rows of the multi-dimensional information array between a first master row and a second master row, producing difference information indicating a difference between each of the multiple rows and the first master row.

17. The computer system as in claim 16, wherein the at least one processor device further performs operations of:
allocating each respective cell in the multi-dimensional information array to store a single bit value indicating whether a respective subscriber tuned to the particular content at a given instant in time associated with the respective cell.

18. The computer system as in claim 16, wherein populating the cells with values includes producing a bit string for each respective subscriber, the bit string indicating instances in time in which the respective subscriber tuned to the particular content; and
storing the bit string for each respective subscriber in a corresponding column of the multi-dimensional information array assigned to the respective subscriber.

19. The computer system as in claim 16, wherein the at least one processor device further performs operations of:
receiving a bit mask;
applying the bit mask to the multi-dimensional information array to filter data of interest; and
utilizing the data of interest to produce a response to a query.

20. The computer system as in claim 16, wherein the at least one processor device further performs operations of:
producing an index file to keep track of a location of the master rows and corresponding difference information for a respective section in the file.

21. Computer-readable hardware storage having instructions stored thereon, the instructions, when carried out by at least one processing device, causes the at least one processing device to perform operations of:
producing a multi-dimensional information array to include multiple intersecting rows and columns of cells;
assigning a unique subscriber value to each of the columns;
assigning a unique time value to each of the rows; and
populating the cells with values to indicate which of multiple subscribers tuned to particular content over time;
compressing the multi-dimensional information array; and
initiating storage of the compressed multi-dimensional information array in a repository;
wherein compressing the multi-dimensional information array includes:
at times spaced apart in accordance with a predetermined time interval value, selecting rows of the cells corresponding to the times to be master rows in the multi-dimensional information array;
for multiple rows of the multi-dimensional information array between a first master row and a second master row, producing difference information indicating a difference between each of the multiple rows and the first master row.

* * * * *